Jan. 12, 1965    A. S. ROBINSON    3,165,730
ENCODER
Filed April 15, 1959    4 Sheets-Sheet 4

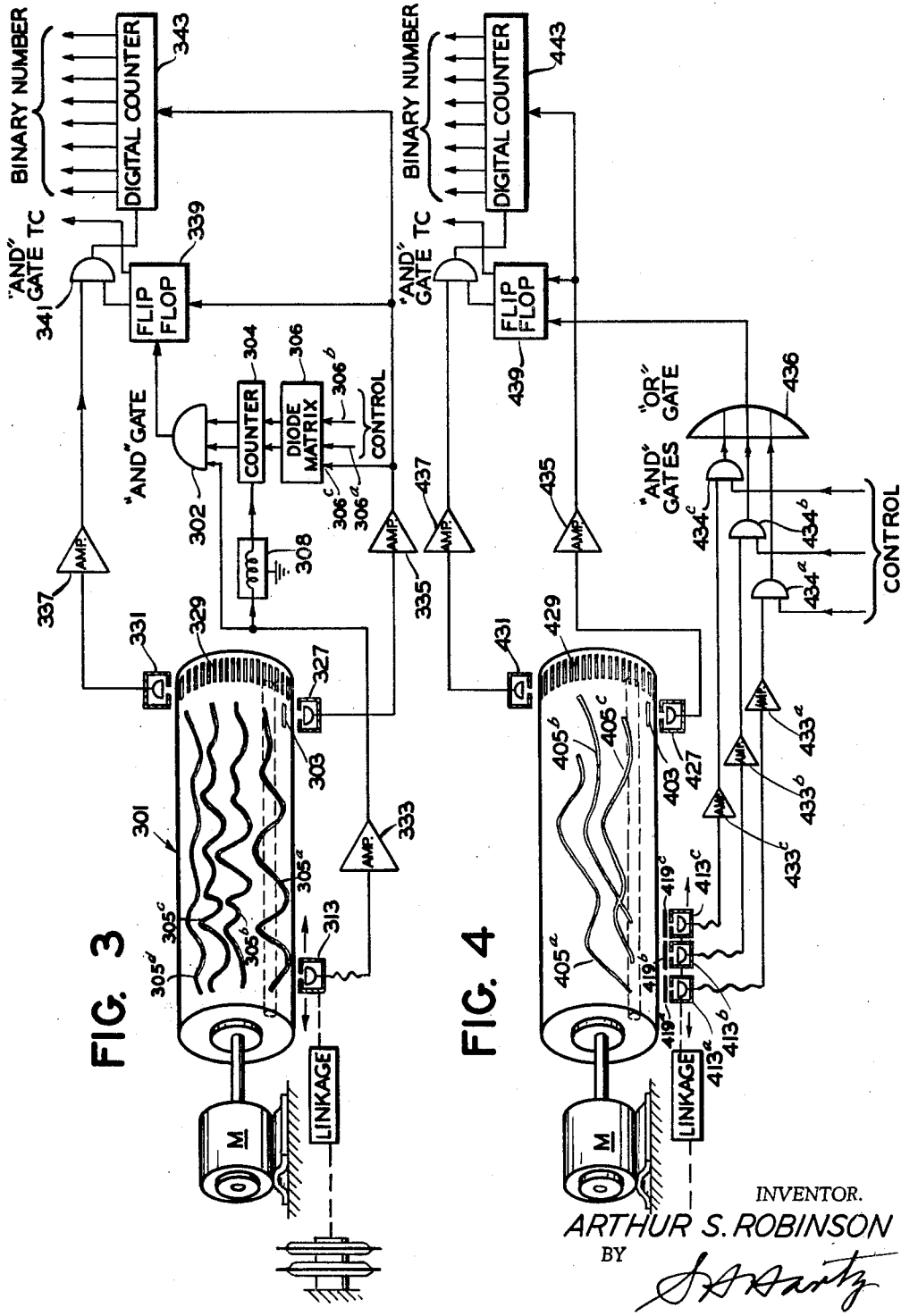

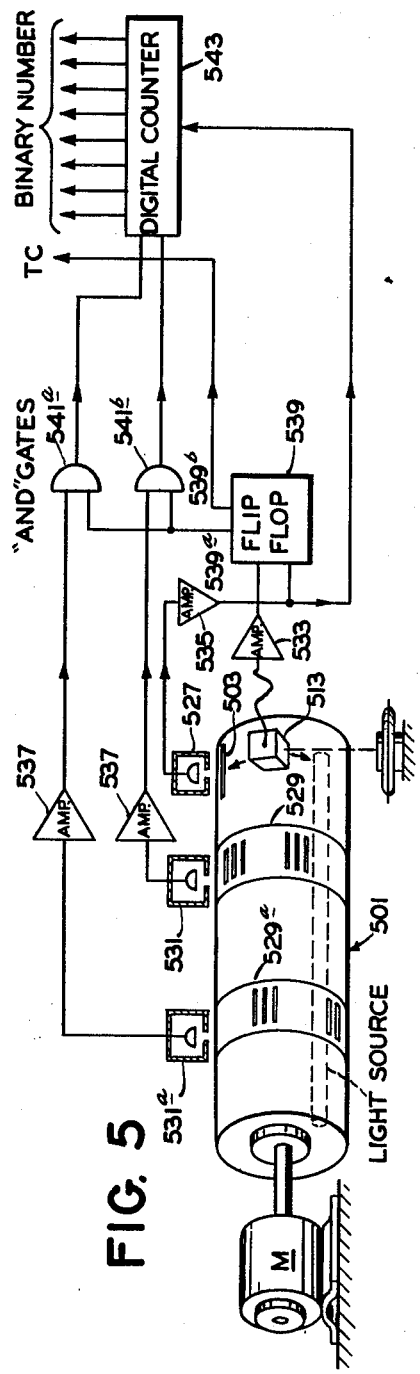
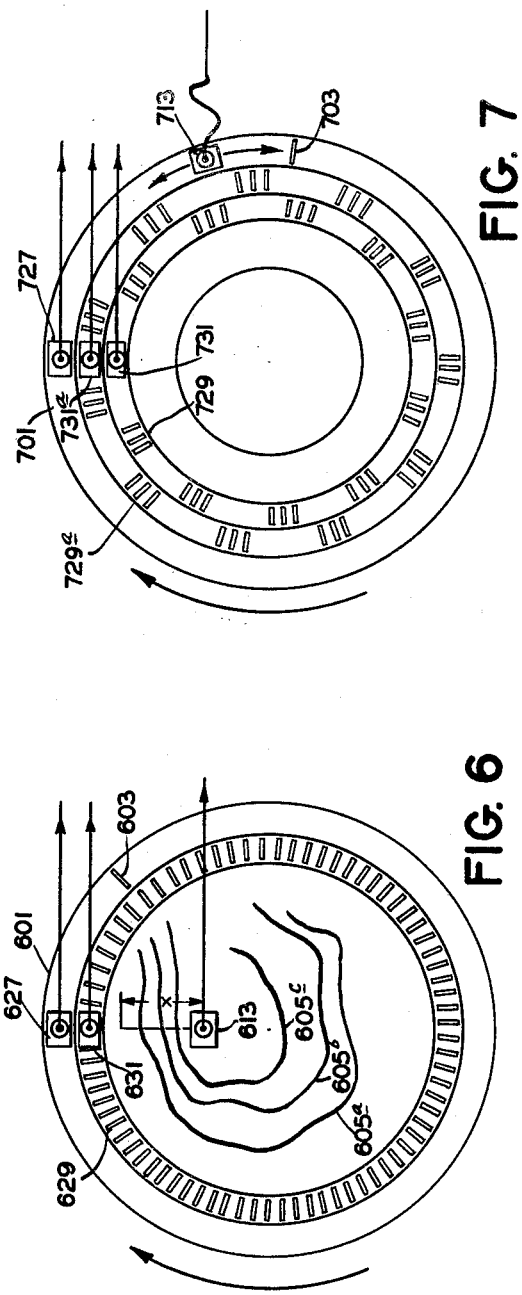

INVENTOR.
ARTHUR S. ROBINSON
BY
ATTORNEY

United States Patent Office 3,165,730
Patented Jan. 12, 1965

3,165,730
ENCODER
Arthur S. Robinson, Allendale, N.J., assignor to The Bendix Corporation, a corporation of Delaware
Filed Apr. 15, 1959, Ser. No. 806,625
10 Claims. (Cl. 340—347)

This invention relates to encoders and more particularly to analog to digital encoders for converting mechanical displacements to digital numbers.

One object of the invention is to provide an encoder which converts a mechanical displacement to a digital number according to an arbitrary predetermined function of the displacement and which is accurate, compact, light in weight and has a high degree of resolution.

Another object of the invention is to provide an encoder which provides a substantial number of arbitrary functions of a variable on a single unit.

Another object is to provide an encoder in which the functions are truly arbitrary and may include steep slopes and discontinuities.

Another object of the invention is to provide an encoder which operates independently of the encoder drive motor speed.

Another object is to provide an encoder which is simple in design and may readily be mass produced.

Another object is to provide an encoder in which intelligence may be encoded on a cylinder or disc or any other suitable device.

The invention contemplates a function encoder comprising a member, such as a cylinder or disc, having intelligence thereon corresponding to a preselected function which varies in value in accordance with a condition, pick-up means for scanning the member and providing signals, and means for controlling the pick-up means in accordance with the condition so that the signals from the pick-up means correspond to the condition according to the preselected function. The signals may comprise a series of pulses which may be applied to a counter so that the digital output of the counter corresponds to the condition according to the preselected function.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

In the drawings:

FIGURE 1 is a schematic diagram of a novel encoder constructed according to the invention.

FIGURE 2 is a schematic diagram similar to FIGURE 1 showing a second embodiment of the invention.

FIGURES 3 and 4 are schematic diagrams of novel encoders having several functions on a single cylinder.

FIGURE 5 is a schematic diagram showing another embodiment of the invention.

FIGURES 6 and 7 are schematic diagrams showing other embodiments of the invention in which the functions are stored on discs instead of cylinders.

Figure 8:
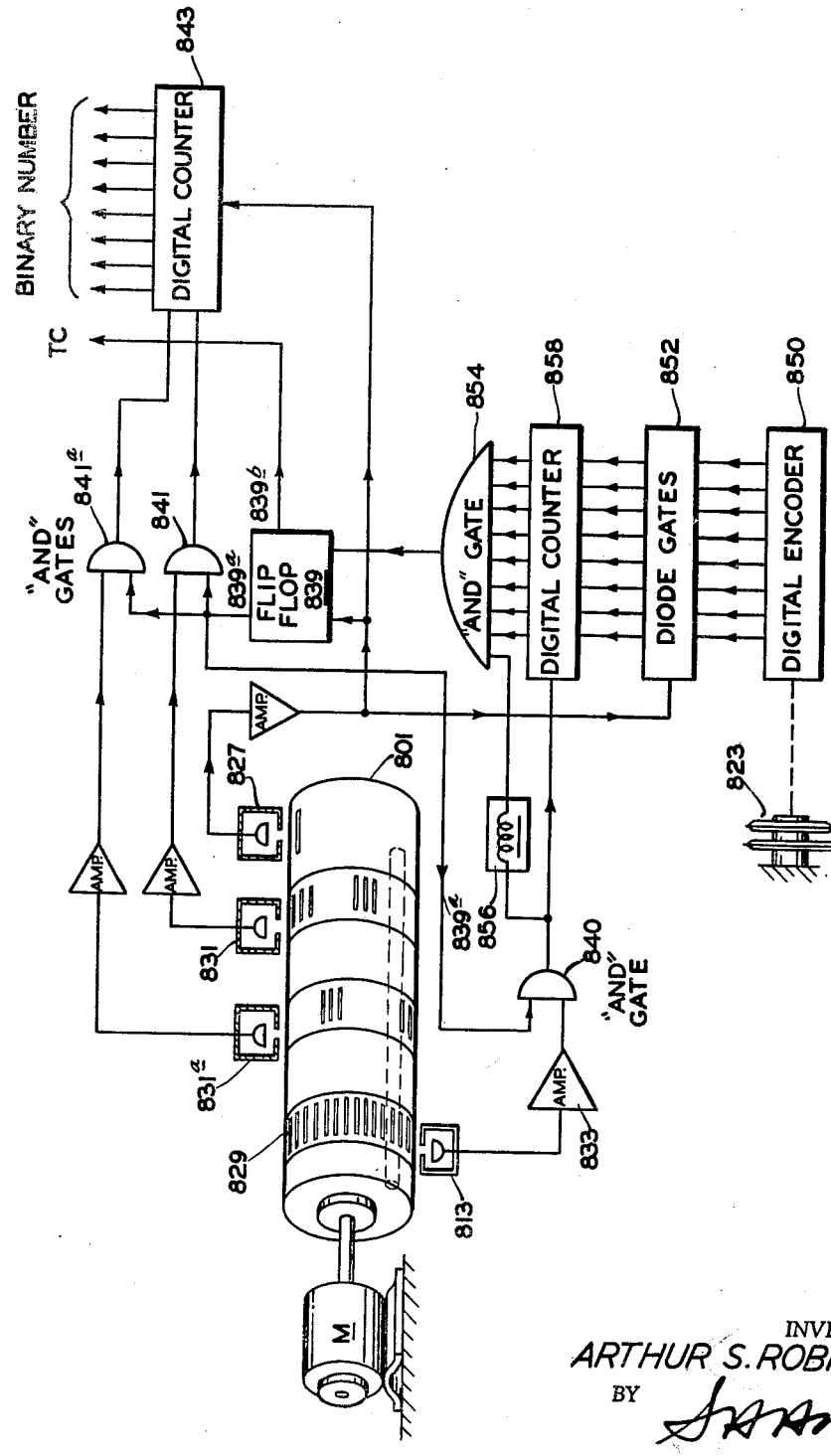
FIGURE 8 is a schematic diagram showing another embodiment of the invention.

In FIGURE 1, the novel encoder shown therein and constructed according to the invention comprises an opaque cylinder 1 having intelligence thereon in the form of a short transparent reference line 3 and a curved transparent reference or function line 5 shaped to provide a graph of a desired arbitrary preselected function of a variable condition. The interior of the drum may be lighted in any suitable manner and in the present embodiment an elongated fixed light source 7 is positioned within cylinder 1. The cylinder is rotated at relatively high speed by a motor 9 through a shaft 11.

A photo-electric pick-up 13 is moved in any suitable manner lengthwise of the cylinder and parallel to the cylinder axis and perpendicular to the direction of rotation of the cylinder in accordance with the variable condition. Pick-up 13 may comprise a photocell 17 enclosed within a shield 19 having a small aperture 21 therein adjacent the cylinder to transmit light from light source 7 to the photocell when function line 5 is coincident with the aperture. In the embodiment shown, pick-up 13 is moved parallel to the cylinder axis through suitable linkage 25 by an aneroid 23 responsive to pressure.

A fixed pick-up 27 similar to pick-up 13 is positioned adjacent cylinder 1 and is aligned lengthwise of the cylinder with reference line 3. As cylinder 1 rotates, a first reference pulse referred to hereinafter as a reference pulse is produced by pick-up 27 each time reference line 3 passes the pick-up and a second reference pulse, hereinafter referred to as a function pulse, is produced by pick-up 13 each time function line 5 passes the pick-up. One reference pulse and one function pulse are produced with each revolution of the cylinder and the spacing of the pulses is determined by the circumferential distance between the reference line and function line at the place being scanned by pick-up 13.

The encoder may be made independent of motor speed by providing a fixed photoelectric pick-up 31, similar to pick-up 13, for scanning a series of transparent increment lines 29 equally spaced about the circumference of cylinder 1 so that a pulse is produced each time an increment line 29 passes pick-up 31. With this arrangement, the accuracy of the encoder does not depend on uniform speed of rotation of motor 9 because the distance between reference line 3 and function line 5 is measured by increment lines 29 and not by a time interval.

The pulses from pick-ups 13, 27 and 31 are amplified by amplifiers 33, 35 and 37, respectively. The reference and function pulses from pick-ups 13 and 27 are applied to a "flip-flop" circuit 39 which may be of the kind shown at page 47 of "Arithmetic Operation in Digital Computers," by R. K. Richards, and published by D. Van Nostrand Co., Inc. The reference and function pulses set and re-set the "flip-flop" reference circuit so that a direct current voltage is alternately provided at outputs 39a and 39b. The "flip-flop" circuit acts as a switching arrangement and provides a D.C. output at 39a when reset by a reference pulse and provides no output at 39a when set by a function pulse. The "flip-flop" circuit also provides a D.C. output at 39b when set by a function pulse and no output at 39b when reset by a reference pulse. Thus, the "flip-flop" circuit provides a D.C. output at 39a in the interval between the reference pulse and the function pulse and no output at 39a in the interval between the function pulse and the reference pulse. Also, the "flip-flop" circuit provides no D.C. output at 39b in the interval between the reference pulse and the function pulse and a D.C. output at 39b in the interval between the function pulse and the reference pulse.

The D.C. output 39a of "flip-flop" circuit 39 together with the amplified increment pulses from pick-up 31 are applied to an "and" gate 41 which may be of the kind shown at page 74 of "Arithmetic Operation in Digital Computers," by R. K. Richards, and published by D. Van Nostrand Co., Inc., and which passes the increment pulses only when the gate is energized by the direct current output 39a from "flip-flop" 39. During each revolution of cylinder 1, the "and" gate passes the increment pulses in the interval between the reference pulse and the function pulse and blocks the increment pulses in the interval between the function pulse and the reference pulse.

The reference pulses from pick-up 27 are applied to the reset line of a digital counter 43 and each pulse resets the counter. The digital counter may be of the kind shown at page 194 of "Arithmetic Operation in Digital Computers," by R. K. Richards, and published by D. Van Nostrand Co., Inc. The gated increment pulses from "and" gate 41 are applied to the digital counter 43 during the interval between the reference pulse and the function pulse and provide a parallel binary number in the counter. The increment pulses are stopped by "and" gate 41 during the interval between the function pulse and the reference pulse and do not reach the counter during this interval. During this interval also the D.C. output 39b of "flip-flop" 39 transfers the unchanging parallel binary number in the digital counter corresponding to the desired digital reading to the controlled or computer circuit using this information by means of connection 39c and designated T.C. (transfer command).

With the arrangement described, the mechanical displacement of pick-up 13 is converted at counter 43 to a digital output which is an arbitrary function of the displacement.

The novel encoder shown in FIG. 2 is similar to the encoder shown in FIG. 1 except that reference line 203 extends substantially the length of cylinder 201 and pick-up 213 scans both function line 205 and reference line 203. This arrangement facilitates laying out the function and reference lines. In this embodiment, pick-up 213 comprises an elongated light sensitive surface 217 and a shield 219 adjacent thereto and movable parallel to the cylinder axis. An ordinary bulb 207 may be used as the light source and the bulb is mounted within cylinder 201 on a bracket 208 fixed to shield 219 and extending into an open end of cylinder 201. Shield 219 has a small aperture 221 therein opposite bulb 207 which permits light from the interior of cylinder 201 to fall upon light sensitive surface 217 each time reference line 203 and function line 205 pass the aperture to provide alternate reference and function pulses. Increment lines 229 and pick-up 231 are provided similar to increment lines 29 and pick-up 31 in FIG. 1.

With this arrangement, the reference pulses and the function pulses are identified by setting a "flip-flop" circuit 238 with synchronizing pulses from a pulse former 210 connected to the same excitation source used to operate synchronous motor 209 which drives cylinder 201. One synchronizing pulse occurs just before the reference pulse for each cylinder revolution and provides only an approximate reference, since the motor may vary in phase and depart from exact synchronism with the frequency of the excitation source.

The reference and function pulses from pick-up 213 are amplified by amplifier 233 and the increment pulses from pick-up 231 are amplified by amplifier 237. The amplified reference and function pulses are applied to "and" gates 240 and 242 controlled by outputs 238a and 238b of "flip-flop" 238, respectively. "And" gate 242 is open and passes reference pulses only when a direct current voltage is present at output 238b of "flip-flop" circuit 238 and "and" gate 240 is open and passes function pulses only when a direct current voltage is present at output 238a of "flip-flop" circuit 238.

The synchronizing pulses from pulse former 210 set "flip-flop" circuit 238 so that a direct current voltage appears at output 238b and no voltage is present at output 238a. The reference pulses passed by "and" gate 242 reset "flip-flop" circuit 238 so that no direct current output is present at 238b and a direct current output appears at 238a.

With this arrangement the function pulses and reference pulses are separated and operate "flip-flop" circuit 239 to open and close "and" gate 241 so that increment pulses from amplifier 237 are passed to counter 243 only during the interval between the reference pulse and function pulse as described in connection with FIG. 1.

FIG. 3 shows a novel encoder similar to FIG. 1 wherein a plurality of function lines 305a, 305b, 305c and 305d are encoded on a cylinder 301 and the function lines are scanned by a single pick-up 313 which provides a function pulse for each function line. The cylinder has a reference line 303 and linearly spaced increment lines 329 thereon scanned by pick-ups 327 and 331, respectively, which provide reference and increment pulses. The function pulses from pick-up 313, the reference pulses from pick-up 327 and the increment pulses from pick-up 331 are amplified by amplifiers 333, 335 and 337, respectively.

Since a function pulse occurs for each function line with each revolution of the cylinder, suitable means are provided to identify the desired function pulse and reject the remaining function pulses upon each revolution of cylinder 301. The amplified function pulses from pick-up 313 and amplifier 333 are applied to "and" gate 302 which is controlled by digital counter 304 to pass only the desired function pulse and block the other pulses.

A code pattern applied to control lines 306a and 306b of diode matrix 306 is transferred in parallel through the diode matrix to counter 304 by each reference pulse from pick-up 327 applied to the matrix at control lines 306c to preset the counter upon each revolution of cylinder 301 so that a fixed number of function pulses are required to set the counter to 0. "And" gate 302 is energized by counter 304 so that the gate opens only when the counter reading is 0.

If, for example, the first function line 305a is selected, the reference pulse presets counter 304 to 0 under control of control lines 306a and 306b. Gate 302 then passes only the first function pulse. The function pulses also are applied via delay line 308 to counter 304, changing the counter reading to 1 thus closing gate 302.

If the second function pulse is to be selected, counter 304 is preset by the reference pulse to a reading corresponding to the maximum counter capacity. The first function pulse to appear after the reference pulse is blocked by gate 302 but is applied via delay line 308 to counter 304 advancing the counter reading to 0. The second function pulse, which is the desired pulse, then passes directly through gate 302 and, via delay line 308 advances counter 304 to 1, thus again closing gate 302. Any desired function on cylinder 301 can be selected in this manner by appropriately presetting counter 304 by the reference pulse with a suitable code pattern on control lines 306a and 306b of diode matrix 306.

The selected function pulse from "and" gate 302 and amplified reference pulse from pick-up 327 and amplifier 335 are applied to "flip-flop" circuit 339 and the direct current output of "flip-flop" circuit 339 controls "and" gate 341 to pass to digital counter 343 increment pulses from pick-up 331 in the interval between the reference pulse and the selected function pulse and to block increment pulses in the interval between the selected function pulse and reference pulse for each revolution of cylinder 301, similarly to FIG. 1.

The encoder shown in FIG. 4 is similar to that shown in FIG. 3 except that in FIG. 4 function lines 405a, 405b and 405c of different colors are used with correspondingly colored filters 419a, 419b and 419c on pick-ups 413a, 413b and 413c to facilitate identifying the desired function pulses. With this arrangement, the function pulse for each function line appears on a separate pick-up.

Reference line 403 and linearly spaced increment lines 429 are scanned by fixed pick-ups 427 and 431, respectively. Function pulses from pick-ups 413a, 413b and 413c are amplified by amplifiers 433a, 433b and 433c, respectively. Also, reference and increment pulses from pick-ups 427 and 431 are amplified by amplifiers 435 and 437, respectively.

With this arrangement the function pulses are readily identified from one another since they appear separately at the outputs of amplifiers 433a, 433b and 433c. Amplifiers 433a, 433b and 433c are connected to "and" gates 434a, 434b and 434c, respectively. Each of these "and" gates has a second input which opens only one "and" gate during each cylinder revolution so that only one function pulse will appear at the output of "or" gate 436 connected to the "and" gates. The "or" gate may be of the kind shown at page 74 of "Arithmetic Operation in Digital Computers," by R. K. Richards, and published by D. Van Nostrand Co., Inc. Selection of the desired function is therefore simply accomplished by opening the appropriate "and" gate. The selected function pulse is applied to "flip-flop" circuit 439 and the desired reading of increment pulses is obtained in digital counter 443 in a manner identical to FIG. 1.

In FIG. 5 increment lines 529 are positioned circumferentially about cylinder 501 and are spaced non-linearly according to the desired arbitrary preselected function of a variable. Each space between the lines corresponds to an incremental increase in the stored function. If the stored function both increases and decreases, incremental lines 529a are required and correspond to the increments to be subtracted. Fixed pick-ups 531 and 531a scan incremental lines 529 and 529a, respectively.

A fixed reference pick-up 527 and a circumferentially movable function pick-up 513 scan a reference line 503 on cylinder 501 and provide reference and function pulses as the line passes the pick-ups. The pulses from pick-ups 513, 527, 531 and 531a are amplified by amplifiers 533, 535, 537 and 537a, respectively.

The function and reference pulses from pick-ups 513 and 527 operate "flip-flop" circuit 539 similarly to the operation of "flip-flop" circuit 39 in FIG. 1. In FIG 5, "flip-flop" circuit 539 controls two "and" gates 541a and 541b so that the "and" gates pass to digital counter 543 only the incremental pulses scanned by pick-ups 531 and 531a in the interval between the reference and function pulses and block the increment pulses in the interval between the function and reference pulses. The pulses from "and" gate 541b are applied to the counter so that the pulses are added and the pulses from "and" gate 541a are applied to the counter so that the pulses are subtracted. As mentioned above, this arrangement permits the use of stored functions which both increase and decrease.

While only two channels of increment lines are shown on cylinder 501, it should be understood that any number of channels may be used with appropriate pick-up and "and" gates for selecting the appropriate pair of channels.

The arrangement in FIG. 6 stores the intelligence on a disc 601 instead of on cylinders as in the embodiments shown in FIGS. 1 thru 5. The arrangement shown in FIG. 6 stores a plurality of arbitrary functions as in FIG. 3. The intelligence comprises a graph arranged circularly about the center of the disc in the form of function lines 605a, 605b and 605c, equally spaced increment lines 629 and a reference line 603. A radially movable pick-up 613 scans the function lines and fixed pick-ups 631 and 627 scan the increment lines and reference line, respectively. The function pulses from pick-up 613, the increment pulses from pick-up 631 and the reference pulses from pick-up 627 are amplified and control a digital counter in the same manner as in FIG. 3.

The arrangement shown in FIG. 7 is similar to the arrangement of FIG. 5 except that a disc 701 is used instead of a cylinder and the intelligence is arranged circularly on the disc as in FIG. 6. In FIG. 7, increment lines 729 and 729a are spaced non-linearly on the disc according to the desired arbitrary pre-selected function of a variable. Increment lines 729 provide for incremental increases in the stored function and incremental lines 729a provide for incremental decreases in the stored function. Suitable fixed pick-ups 731 and 731a scan the increment lines and provide increment pulses. Reference line 703 is scanned by a circumferentially movable function pick-up 713 and fixed reference pick-up 727 to provide function and reference pulses. The increment pulses, function pulses and reference pulses are applied to a counter and are utilized in the same manner as the corresponding pulses in FIG. 5.

FIG. 8 is similar to FIG. 5 except that function pulses are obtained electronically. Instead of using a movable pick-up 513 as in FIG. 5, the condition sensor 823 provides in digital encoder 850 a digital number corresponding to the condition. In FIG. 8, a series of linearly spaced counting lines 829 are provided on cylinder 801 and the counting lines are scanned by pick-up 813. The counting pulses from pick-up 813 are amplified by amplifier 833 and are applied to "and" gate 840 which is also energized by line 839a from "flip-flop" 839. Gate 840 is closed during the period before the generation of the reference pulse by pick-up 827 and is opened to pass the counting pulses to digital counter 858 when the reference pulse from pick-up 827 resets "flip-flop" 839.

The reference pulse from pick-up 827 simultaneously resets "flip-flop" 839 and digital counter 843 and opens diode gate 852 to preset digital counter 858 with a digital number corresponding to the digital number from digital encoder 850. "And" gate 854 is controlled by digital counter 858 so that it opens only when digital counter 858 reads 0. Since digital counter 858 is preset by digital encoder 850 when the reference pulse is generated by pick-up 827, gate 854 is initially closed. Counting pulses from pick-up 813 applied to digital counter 858 are counted until the counter reading is 0. The counting pulse causing this final transition is applied to "and" gate 854 through delay line 856 and passes as a function pulse through "and" gate 854 to set "flip-flop" 839. The setting of "flip-flop" 839 closes gates 841 and 841a and gate 840. The arrangement described in FIG. 8 otherwise operates in the same manner as the arrangement shown in FIG. 5 so that the increment pulses from pick-ups 831 and 831a in the interval between the reference pulse from pick-up 827 and function pulse from "and" gate 854 pass to digital counter 843 and the increment pulses in the interval between the function pulse from "and" gate 854 and the reference pulse from pick-up 827 are blocked. The pulses from "and" gate 841 are applied to the counter so that the pulses are added and the pulses from "and" gate 841a are applied to the counter so that the pulses are subtracted. The output of pick-up 813 is controlled by condition sensor 823 through digital encoder 850 to provide a function pulse in accordance with the condition.

The encoder described herein and constructed according to the invention converts mechanical displacements to digital numbers according to any arbitrary predetermined function of the displacement and the encoder is accurate, compact, light in weight and has a high degree of resolution. The encoder may be used to provide a substantial number of arbitrary functions of a variable on a single unit and the functions are truly arbitrary and may include steep slopes and discontinuities. The encoder operates independently of the encoder drive motor speed and is simple in design and may readily be mass produced.

Instead of using photo-electric pick-ups responsive to illuminated transparent function lines as described herein, capacitive or inductive sensing may be used by inscribing the reference and function lines as conducting surfaces or as magnetic material and using capacitive or inductive pick-ups to detect the passage of a line and provide corresponding pulses.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art. While in the embodiments shown the cylinder or disc is rotated and the pick-up is moved in response to a condition, in some instances it may be desirable to rotate the pick-up and move the cylinder or disc in response to the condition or some other arrangement may be used for providing the desired relative movement.

What is claimed is:

1. A function encoder comprising a member having increment and reference intelligence thereon, the increment intelligence corresponding to a preselected nonlinear function which varies in value in accordance with a condition and comprising a series of unevenly spaced lines arranged in accordance with the function, pick-up means for scanning the member and providing increment and first and second reference signals, means for controlling the pick-up means providing one reference signal in accordance with the condition, and means connected to the pick-up means providing the reference and increment signals and responsive to the increment signals in the interval between the reference signals and providing an output corresponding to the condition according to the preselected function.

2. A function encoder comprising a member having increment and reference intelligence thereon, the increment intelligence corresponding to a preselected nonlinear function which varies in value in accordance with a condition and comprising a series of unevenly spaced lines arranged in accordance with the function pick-up means for scanning the member and providing increment and first and second reference signals, means providing relative movement between the member and pick-up means, means for controlling the pick-up means providing one reference signal in accordance with the condition, and means connected to the pick-up means providing the reference and increment signals and responsive to the increment signals in the interval between the reference signals and providing an output corresponding to the condition according to the preselected function.

3. A function encoder comprising a member having increment and reference intelligence thereon, the increment intelligence corresponding to a preselected nonlinear function which varies in value in accordance with a condition and comprising a series of unevenly spaced lines arranged in accordance with the function, pick-up means for scanning the intelligence and providing increment and first and second reference signals, means for controlling the pick-up means providing one reference signal in accordance with the condition, counting means connected to the pick-up means providing increment signals, and means connected to the pick-up means providing reference signals and controlling the counting means to respond to increment signals in the interval between the reference signals to provide an output corresponding to the condition according to the preselected function.

4. An encoder as described in claim 3 in which the intelligence is in the form of transparent lines illuminated by a light source and the pick-up means comprises photoelectric means.

5. A function encoder comprising a member having increment and reference intelligence thereon, the increment intelligence corresponding to a preselected nonlinear function which varies in value in accordance with a condition and comprising a series of unevenly spaced lines arranged in accordance with the function, pick-up means for scanning the intelligence and providing increment and first and second reference pulses, a counter connected to the pick-up means providing increment pulses, means responsive to the condition for controlling the pick-up means providing one reference pulse in accordance with the condition, and means connected to the pick-up means providing the reference pulses for applying the increment pulses to the counter only in the interval between the first and second reference pulses.

6. A function encoder comprising a member having increment and reference intelligence thereon, the increment intelligence corresponding to a preselected nonlinear function which varies in value in accordance with a condition and comprising a series of unevenly spaced lines arranged in accordance with the function, pick-up means for scanning the member and providing increment and first and second reference pulses, means responsive to the condition for varying the interval between the reference pulses in accordance with the condition, and means connected to the pick-up means providing the reference and increment pulses and providing an output corresponding to the number of increment pulses in the interval between the reference pulses.

7. A function encoder comprising a member having increment and reference intelligence thereon, the increment intelligence corresponding to a preselected nonlinear function which varies in value in accordance with a condition and comprising a series of unevenly spaced lines arranged in accordance with the function, pick-up means for scanning the intelligence and providing increment and first and second reference pulses, a counter connected to the pick-up means providing increment pulses, means responsive to the condition for varying the interval between the first and second reference pulses in accordance with the condition, and means connected to the pick-up means providing the reference pulses for applying the increment pulses to the counter in the interval between the first and second reference pulses.

8. A function encoder comprising a rotatable member having reference and increment intelligence thereon, the increment intelligence corresponding to a preselected nonlinear function which varies in value in accordance with a condition and comprising a series of unevenly spaced lines arranged in accordance with the function, pick-ups for scanning the reference and increment intelligence and providing first and second reference pulses and increment pulses respectively, the pick-up for scanning the increment intelligence being fixed and the pick-up for scanning the function intelligence being movable in accordance with the condition to vary the interval between the reference pulses according to the condition and the preselected function, a counter connected to the pick-up means providing increment pulses, and means connected to the counter and controlled by the reference pulses for applying increment pulses to the counter only in the interval between the reference pulses.

9. A function encoder comprising a member having increment and reference intelligence thereon including a series of increment lines unequally spaced in accordance with a condition according to a pre-selected nonlinear function, pick-up means for scanning the intelligence to provide increment and first and second reference pulses upon coincidence of the pick-up means and the intelligence, means for controlling the pick-up means providing one reference pulse in accordance with the condition to vary the interval between the reference pulses in accordance with the condition, a counter connected to the means providing increment pulses, and means connected to the pick-up means providing the reference pulses for applying the increment pulses to the counter in the interval between the reference pulses.

10. A function encoder comprising a member having increment and reference intelligence thereon including two series of increment lines spaced in accordance with a condition according to a preselected function which both increases and decreases, one series of increment lines corresponding to the increase and the other series of increment lines corresponding to the decrease, pick-up means for scanning the intelligence to provide increment and first and second reference pulses upon coincidence of the pick-up means and the intelligence, means for controlling the pick-up means providing one reference pulse in accordance with the condition to vary the interval between the reference pulses in accordance with the condition, a counter connected to the pick-up means providing increment pulses, and means connected to the pick-up means providing reference pulses for applying the increment pulses to the counter only in the interval between the reference pulses, the increment pulses corresponding to the increase being added in the counter and the increment pulses corresponding to the decrease being subtracted in the counter.

References Cited in the file of this patent

UNITED STATES PATENTS

| | | |
|---|---|---|
| 2,603,123 | Loukomsky et al. | July 15, 1952 |
| 2,792,173 | Schuster | May 14, 1957 |